US010944892B2

(12) United States Patent
Krammer et al.

(10) Patent No.: US 10,944,892 B2
(45) Date of Patent: Mar. 9, 2021

(54) HOUSING PART FOR A CAMERA HOUSING

(71) Applicant: Rosenberger Hochfrequenztechnik GmbH & Co. KG, Fridolfing (DE)

(72) Inventors: Benedikt Krammer, Traunstein (DE); Martin Auer, Anger (DE); Sebastian Mysyk, Burghausen (DE); Thomas Höfling, Fridolfing (DE)

(73) Assignee: ROSENBERGER HOCHFREQUENZTECHNIK GMBH, Fridolfing (DE)

( * ) Notice: Subject to any disclaimer, the term of this patent is extended or adjusted under 35 U.S.C. 154(b) by 0 days.

(21) Appl. No.: 16/492,121

(22) PCT Filed: Oct. 24, 2017

(86) PCT No.: PCT/EP2017/077157

§ 371 (c)(1),
(2) Date: Sep. 7, 2019

(87) PCT Pub. No.: WO2018/171915

PCT Pub. Date: Sep. 27, 2018

(65) Prior Publication Data

US 2020/0236266 A1 Jul. 23, 2020

(30) Foreign Application Priority Data

Mar. 20, 2017 (DE) ..................... 10 2017 002 665.3

(51) Int. Cl.
*H04N 5/225* (2006.01)

(52) U.S. Cl.
CPC ....... *H04N 5/22521* (2018.08); *H04N 5/2252* (2013.01); *H04N 5/2253* (2013.01)

(58) Field of Classification Search
CPC . H04N 5/22521; H04N 5/2252; H04N 5/2253
See application file for complete search history.

(56) References Cited

U.S. PATENT DOCUMENTS 5,864,365 A * 1/1999 Sramek ............ G08B 13/19619 348/373
2015/0358511 A1* 12/2015 Jung ........................ H04N 5/33 348/143

(Continued)

FOREIGN PATENT DOCUMENTS

CA 2 303 525 A1 9/2001
DE 10 2004 034 383 A1 2/2006

(Continued)

OTHER PUBLICATIONS

Abstract of JP 2007-067113 A.
Abstract of KR 2008-0073072 A.

*Primary Examiner* — Padma Haliyur
(74) *Attorney, Agent, or Firm* — David P. Dickerson

(57) ABSTRACT

The invention relates to a housing part $\mathbf{8}_1$ for a camera housing 7, in particular for use in the automobile sector, having an outer-side housing shell $\mathbf{9}_{12}$ and an inner-side housing shell $\mathbf{9}_{11}$ and an associated production method. The outer-side housing shell $\mathbf{9}_{12}$ is produced from a synthetic material and the inner-side housing shell $\mathbf{9}_{11}$ is produced from a material that is more capable of conducting heat than the synthetic material of the outer-side housing shell $\mathbf{9}_{12}$. The outer-side housing shell $\mathbf{9}_{12}$ is connected respectively directly to the inner-side housing shell $\mathbf{9}_{11}$ via all the opposite-lying surface regions of the outer-side housing shell $\mathbf{9}_{12}$ and the inner-side housing shell $\mathbf{9}_{11}$.

20 Claims, 5 Drawing Sheets

(56) References Cited

U.S. PATENT DOCUMENTS

Figure 1A:
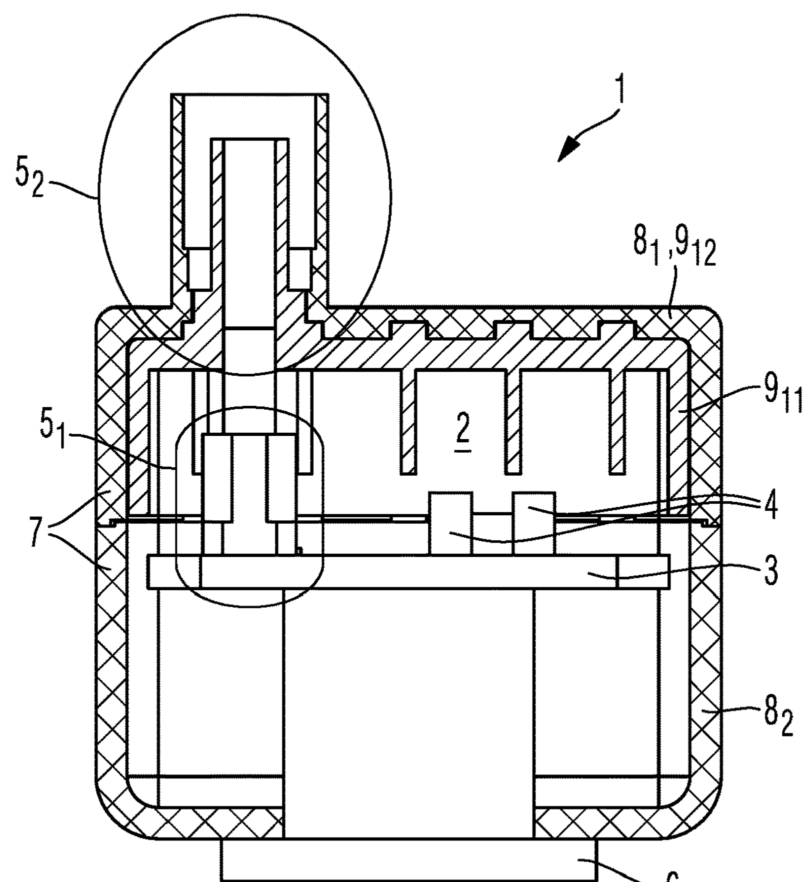

| | | | | |
|---|---|---|---|---|
| 2015/0358564 | A1* | 12/2015 | Kang | H04N 5/2252 348/244 |
| 2018/0107099 | A1* | 4/2018 | Yasuda | H04N 5/22521 |
| 2020/0278592 | A1* | 9/2020 | Kosidlo | H04N 5/2254 |

FOREIGN PATENT DOCUMENTS

| | | | |
|---|---|---|---|
| DE | 10 2014 209 611 | A1 | 11/2015 |
| DE | 10 2015 115 363 | A1 | 3/2017 |
| EP | 2 393 277 | A1 | 12/2011 |
| GB | 2505538 | A | 3/2014 |
| JP | 2007067113 | A | 3/2007 |
| JP | 2011-259101 | A | 12/2011 |
| JP | 2016-14564 | A | 1/2016 |
| KR | 20080073072 | A | 8/2008 |
| WO | 2013 117 430 | A1 | 8/2013 |

* cited by examiner

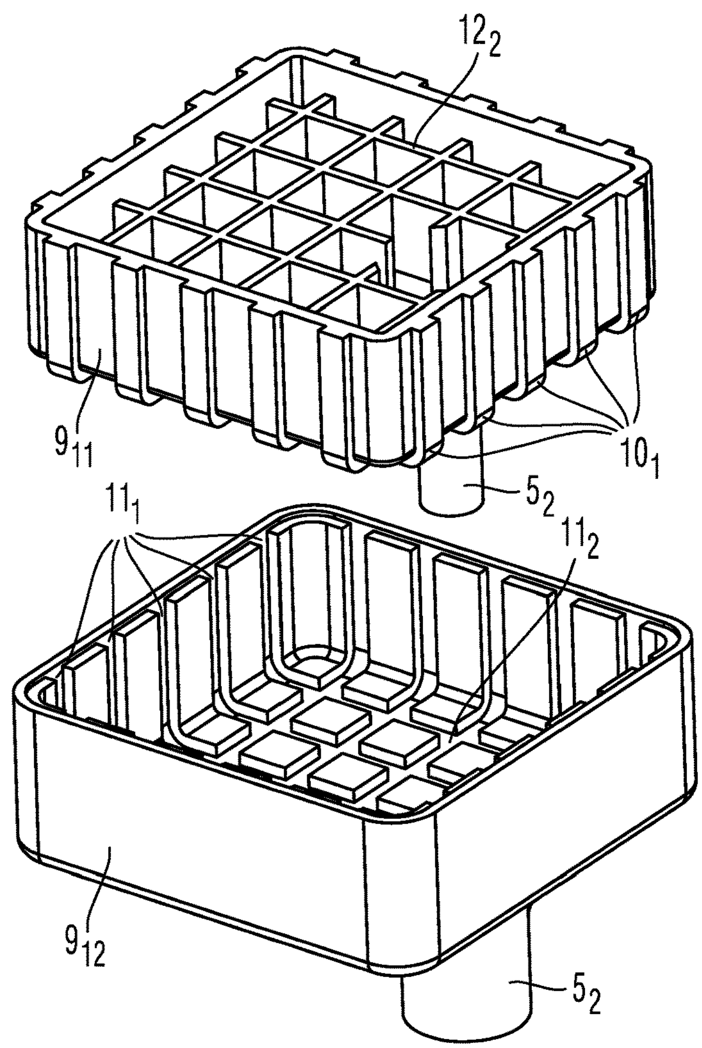
Fig. 4A
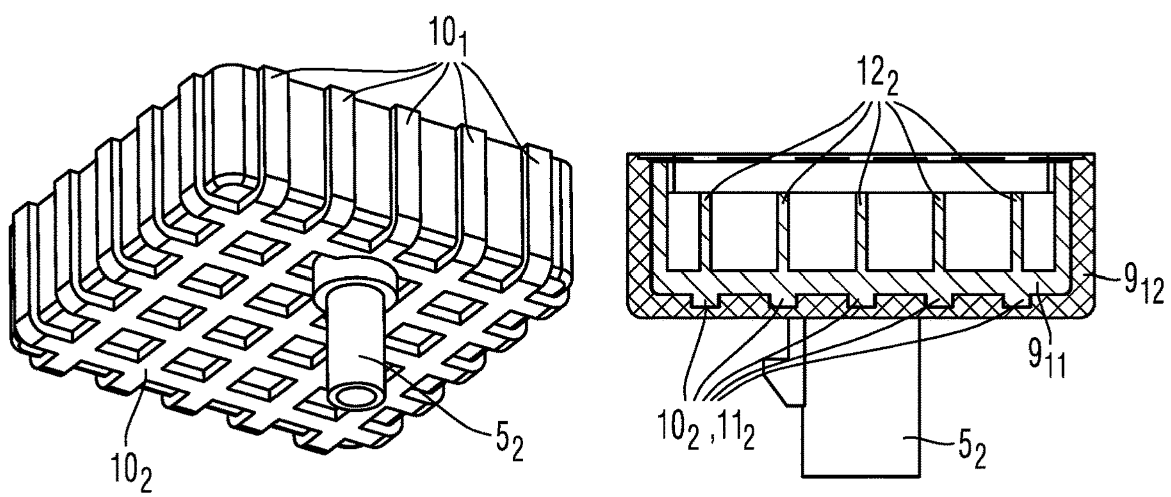
Fig. 4B
Fig. 4C

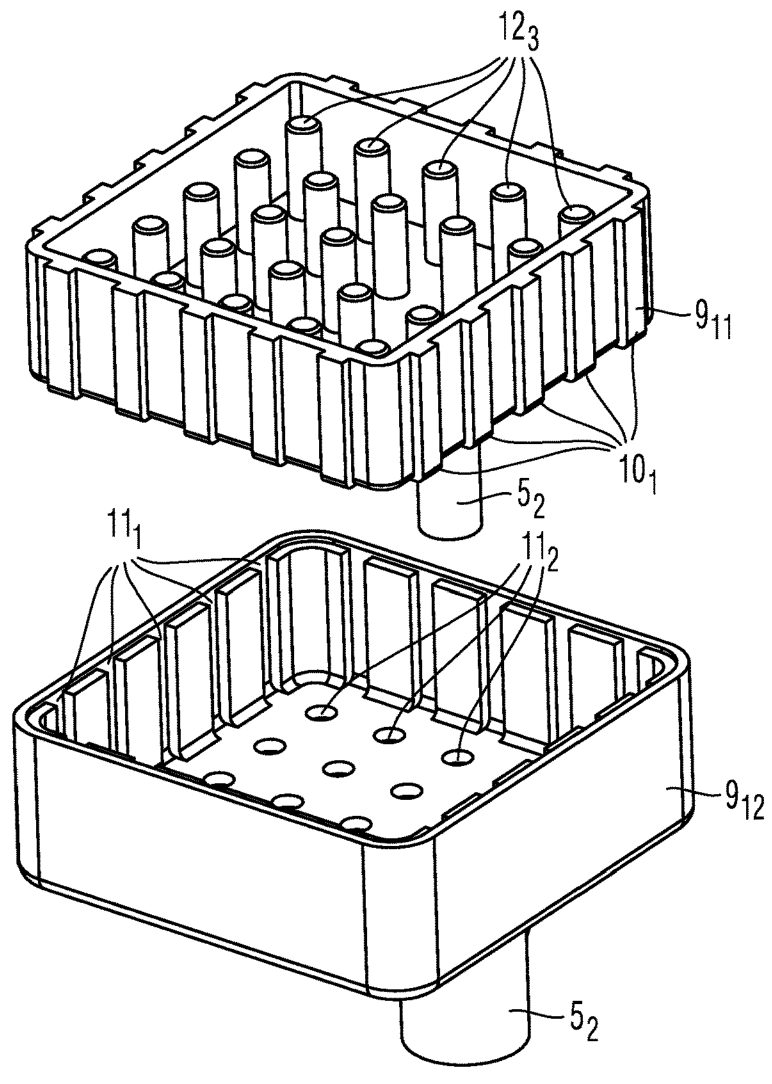
Fig. 5A
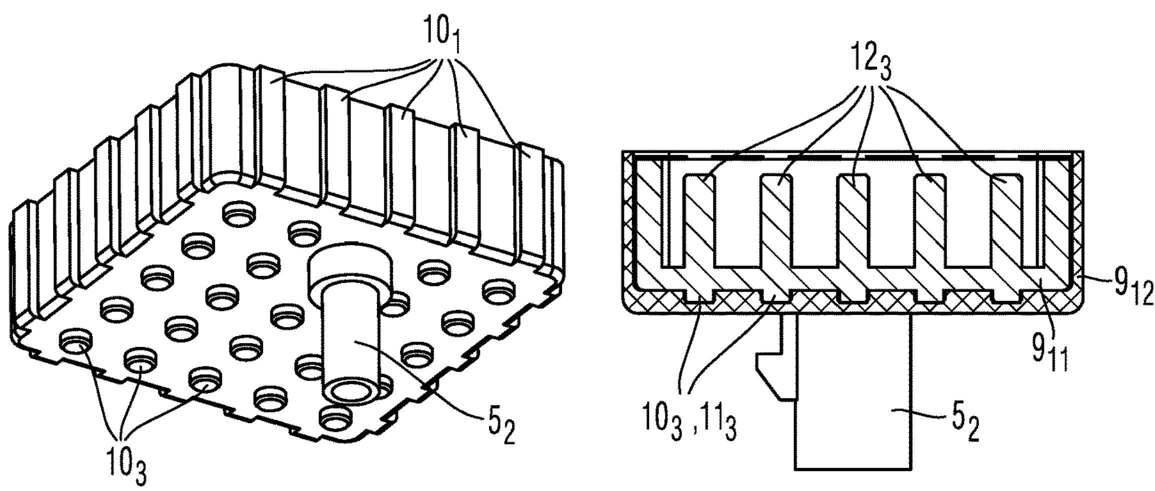
Fig. 5B
Fig. 5C

HOUSING PART FOR A CAMERA HOUSING

FIELD OF THE INVENTION

The present invention relates to a housing part for a camera housing for use in the automobile sector and an associated production method.

TECHNICAL BACKGROUND

Camera modules have been used for many years in the automobile sector in order to identify moving or non-moving objects in the immediate and wider surroundings of a motor vehicle. It is possible, by means of signaling an object that is identified in this manner and accordingly by means of an additional automatic engagement into maneuvering the motor vehicle, in this manner to prevent collisions of the motor vehicle with the object.

Against this background, DE 10 2004 034 383 A1 discloses an exemplary camera module having a camera housing, which is used in the automobile.

Camera modules typically comprise optical and electronic components. Electronic components generate waste heat during operation, which must be dissipated in order to ensure the correct operation of the individual electronic components. The waste heat is typically dissipated via the housing of the camera. Camera housings are produced from a synthetic material, by way of example polybutylene terephthalate (PBT), for reasons such as weight, ease of production, cost and effective resistance to corrosion.

The waste heat that is generated in the electronic system occurs in a spatially-limited area and consequently heats only a limited region of the camera housing that is produced from synthetic material. In addition, conventional synthetic materials, namely synthetic materials with the exception of synthetic materials having electrically-conductive fillers, by way of example having metal, graphite or carbon fibers, are not particularly capable of conducting heat. This heat accumulation in a spatially-limited region of the housing disadvantageously has a negative influence on the correct function of the camera module.

This is a state, which needs to be improved.

SUMMARY OF THE INVENTION

Against this background, an object of the present invention is to provide a camera housing that renders possible an improved dissipation of the waste heat that is generated in the interior of the electronic system of the camera module into the outer region of the camera module.

In light of this background, the present disclosure teaches a housing part for a camera housing, in particular for use in the automobile sector, having an outer-side housing shell and an inner-side housing shell, wherein the outer-side housing shell is produced from a synthetic material and the inner-side housing shell is produced from a material that is more capable of conducting heat than the synthetic material of the outer-side housing shell, wherein the outer-side housing shell is connected respectively directly to the inner-side housing shell via all the opposite-lying surface regions of the outer-side housing shell and the inner-side housing shell.

The present disclosure furthermore teaches a camera housing, in particular for use in the automobile sector, having at least two housing parts, wherein at least one housing part is respectively a housing part in accordance with the present disclosure.

The present disclosure furthermore teaches a motor vehicle having a camera housing in accordance with the present disclosure.

The present disclosure furthermore teaches a production method for a housing part, which comprises the following steps: injection molding an outer-side housing shell from a synthetic material; producing an inner-side housing shell from a material that is more capable of conducting heat than the synthetic material of the outer-side housing shell, and pressing the outer-side housing shell and the inner-side housing shell together, with the result that the outer-side housing shell is connected respectively directly to the inner-side housing shell via all the opposite-lying surface regions of the outer-side housing shell and the inner-side housing shell.

The present disclosure teaches that the respective housing part of the camera housing comprises two housing shells, namely an outer-side housing shell embodied from a synthetic material and an inner-side housing shell embodied from a material that is more capable of conducting heat than the synthetic material of the outer-side housing shell. The material of the inner-side housing shell is preferably a metal. In addition however, a synthetic material having electrically-conductive fillers, by way of example having metal fibers, may be used. In this manner, the material-specific advantages of the two materials, metal and synthetic material, are combined in the housing part of the camera housing:

The metal and accordingly the electrically-conductive fillers of the inner-side housing shell comprises and accordingly comprise in comparison to the synthetic material a clearly improved thermal capacity and is/are more capable of conducting heat and comprises/comprise clearly improved EMC characteristics. The synthetic material of the outer-side housing shell comprises clearly improved anti-corrosion characteristics and may be more easily connected to further housing parts or to housing shells of the camera housing, which are produced from synthetic material.

If the opposite-lying surface regions of the inner-side and the outer-side housing shell do not just extend over a limited region of the camera housing, which the waste heat of the internal electronic system is directly deflected toward, but rather said opposite-lying surface regions extend over a larger region of the camera housing, it is possible owing to the good capability of the metal and accordingly the electrically-conductive fillers to conduct heat to distribute the waste heat that is generated on the inner-side housing shell comparatively rapidly over the entire surface region of the inner-side housing shell. If the inner-side housing shell and the outer-side housing shell are connected to one another directly via all the opposite-lying surface regions, the waste heat that is rapidly distributed over the entire surface region of the inner-side housing shell is thus advantageously transferred to a likewise large opposite-lying surface region of the outer-side housing shell. In this case, per surface unit of the inner-side or outer-side housing shell respectively only a fraction of the waste heat that is originally absorbed by only one limited region of the inner-side housing shell is transferred from the inner-side housing shell to the outer-side housing shell.

Advantageous embodiments and further developments are apparent in the further dependent claims and also in the description with reference to the figures of the drawing.

It is clear that the above-mentioned features and the features yet to be explained below may not only be used in the respectively disclosed combination but rather may also be used in other combinations or alone without departing from the scope of the present invention.

It has proven to be particularly advantageous if the opposite-lying surface regions of the inner-side housing shells and the outer-side housing shell extend over the entire outer surface of the inner-side housing shell and accordingly over the entire inner surface of the outer-side housing shell. In this manner, it is ensured that the waste heat that is typically rapidly absorbed in a limited surface region by the inner-side housing shell is likewise rapidly distributed over the entire surface region of the housing part that comprises the inner-side and the outer-side housing shell.

Air is preferably excluded from the direct connection between the inner-side and the outer-side housing shell in the region of the respective opposite-lying surface regions, in other words said direct connection does not include any air. The waste heat that is emitted by the inner-side housing shell is consequently not stored in an air layer that is located between the inner-side and the outer-side housing shell and only transmitted to the outer-side housing shell after a time delay, but rather is absorbed as rapidly as possible by the opposite-lying outer-side housing shell.

The direct transition between the inner-side and the outer-side housing shell which does not include any of the air that is located between said inner-side and outer-side housing shells is realized in some embodiments by means of a friction-type connection between the inner-side and the outer-side housing shell. The friction-type connection between the inner-side and the outer-side housing shell moreover renders possible a stable mechanical fixing arrangement between the inner-side and the outer-side housing shell.

In order in addition to elevate the direct transition surface between the inner-side and the outer-side housing shell and therefore to bring about an additionally accelerated transfer of heat between the inner-side and the outer-side housing shell, at least one outer surface of the inner-side housing shell respectively comprises at least one elevation that is respectively inserted in an associated depression on the opposite-lying inner surface of the outer-side housing shell.

Alternatively, in some embodiments the individual elevation is provided on at least one inner surface of the outer-side housing shell and is inserted in an associated depression on an opposite-lying outer surface of the inner-side housing shell.

In a first variant, the at least one elevation is respectively realized as a rib-shaped elevation that is inserted in an associated slot-shaped depression. In order to realize a friction-type connection between the inner-side and the outer-side housing shell, the width of the individual rib-shaped elevation is respectively designed as slightly larger than the width of the associated slot-shaped depression.

In a second variant, the at least one elevation is respectively realized as a lattice rib-shaped elevation that is inserted in an associated lattice slot-shaped depression. Also here, with regard to a friction-type connection, the width of the individual rib-shaped elevations that are arranged in a lattice rib-shaped manner is respectively designed as slightly larger than the width of the associated slot-shaped depressions that are arranged in a lattice rib-shaped manner.

In a third variant, finally the at least one elevation is respectively realized as a pin-shaped elevation that is inserted in an associated blind hole-shaped depression. Also here, with regard to a friction-type connection the outer diameter of the pin-shaped elevation is to be designed as larger than the inner diameter of the blind hole-shaped depression.

It is preferred that respectively at least one elevation is provided on at least one inner surface of the inner-side housing shell. In this manner, the upper surface of the inner-side housing shell, which is oriented toward the interior of the camera housing, is additionally enlarged and therefore the flow of heat of the inner-side housing shell is advantageously additionally improved or accelerated.

In a first embodiment, an elevation of this type, which is provided respectively on at least one inner surface of the inner-side housing shell, is embodied as a rib-shaped elevation.

In a second embodiment, an elevation of this type, which is provided respectively on at least one inner surface of the inner-side housing shell, is embodied as a lattice rib-shaped elevation.

In a third embodiment, finally an elevation of this type, which is provided respectively on at least one inner surface of the inner-side housing shell, is embodied as a pin-shaped elevation.

The embodiments and further developments above may be combined with one another in an arbitrary manner provided that the combination is expedient. Further possible embodiments, further developments and implementations of the invention also comprise combinations that are not explicitly mentioned of features of the invention that are described above or below in relation to the exemplary embodiments. In particular, in this case the person skilled in the art will also add individual aspects as improvements or additions to the respective basic form of the present invention.

CONTENTS OF THE DRAWING

Figure 1B:
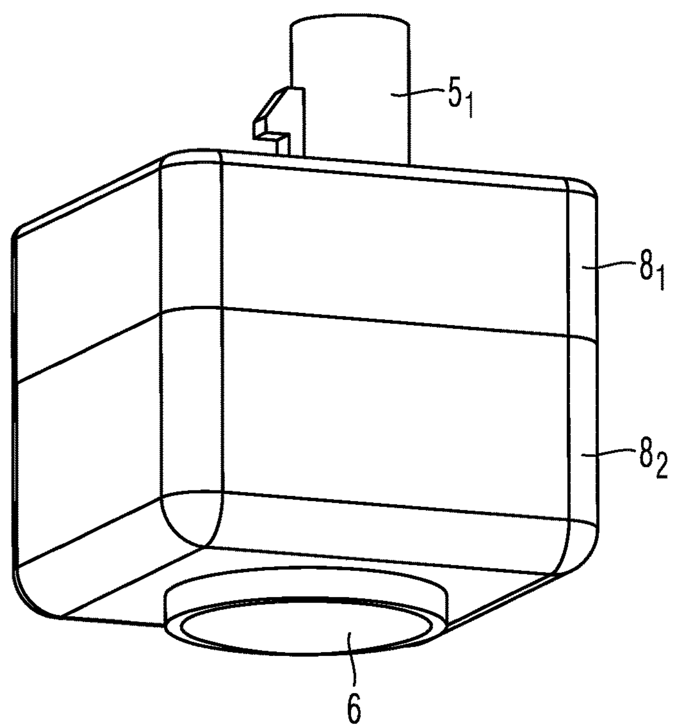
Figure 2A:
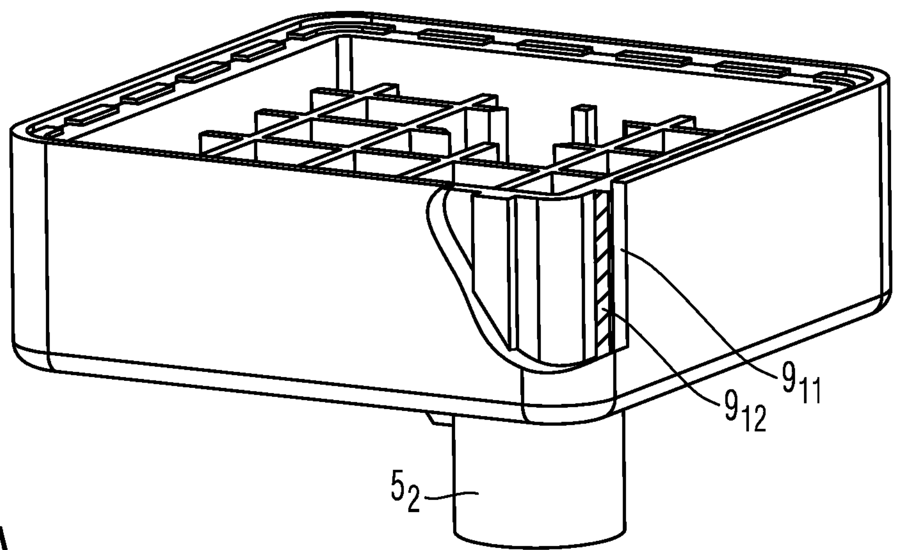
Figure 2B:
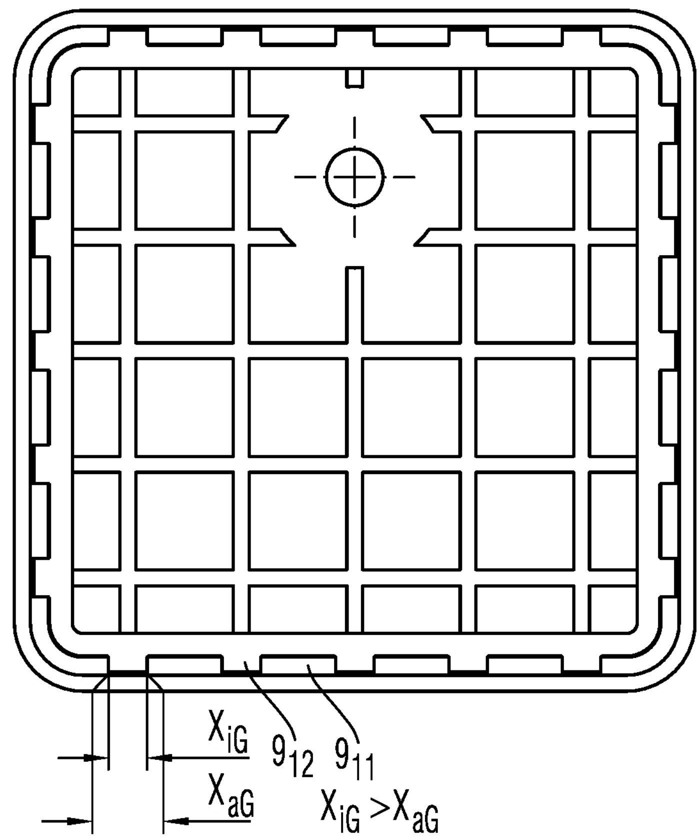
Figure 3A:
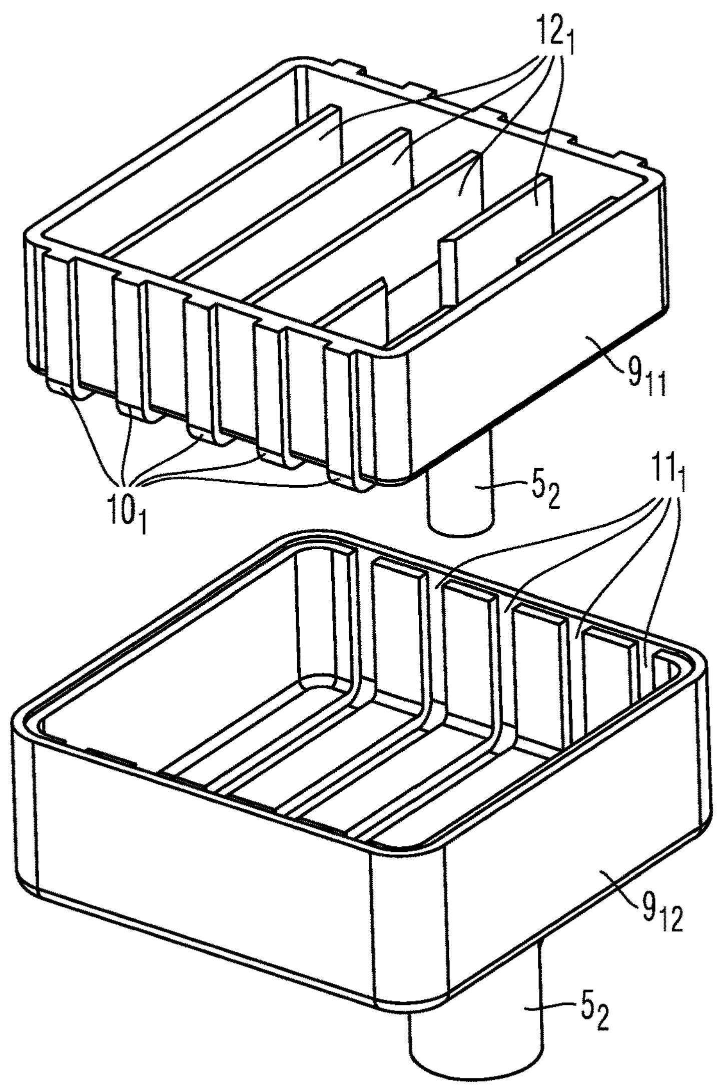
Figure 3B:
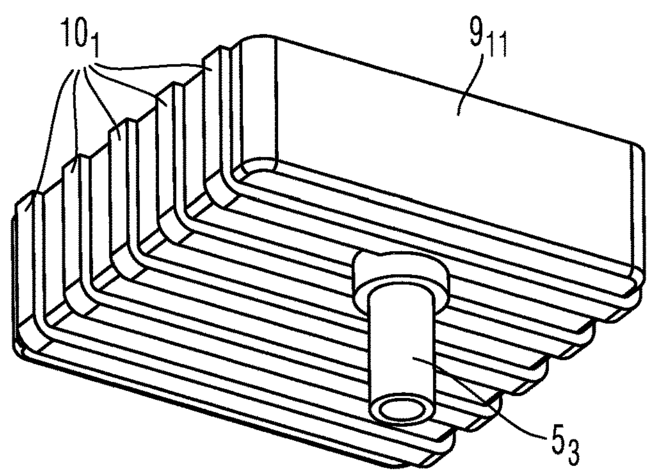

The present invention is explained in further detail below with reference to exemplary embodiments illustrated in the schematic figures of the drawing. In the drawings:

FIG. 1A illustrates a cross-sectional view of a camera housing in accordance with the present disclosure, FIG. 1B illustrates a three-dimensional view of a camera housing in accordance with the present disclosure, FIG. 2A illustrates a three-dimensional cross-sectional view of a housing part in accordance with the present disclosure having a section removed, FIG. 2B illustrates a plan view of a housing part in accordance with the present disclosure, FIG. 3A illustrates a three-dimensional view of a first variant of a housing part in accordance with the present disclosure, FIG. 3B illustrates a three-dimensional view of an inner-side housing shell of a first variant of a housing part in accordance with the present disclosure, FIG. 4A illustrates a three-dimensional view of a second variant of a housing part in accordance with the present disclosure, FIG. 4B illustrates a three-dimensional view of an inner-side housing shell of a second variant of a housing part in accordance with the present disclosure, FIG. 4C illustrates a cross-sectional view of a second variant of a housing part in accordance with the present disclosure, FIG. 5A illustrates a three-dimensional view of a third variant of a housing part in accordance with the present disclosure, FIG. 5B illustrates a three-dimensional view of an inner-side housing shell of a third variant of a housing part in accordance with the present disclosure, and FIG. 5C illustrates a cross-sectional view of a third variant of a housing part in accordance with the present disclosure.

The attached figures of the drawing are to convey a further understanding of the embodiments of the invention. The figures illustrate embodiments and are used in conjunction with the description of the explanation of principles and concepts of the invention. Other embodiments and many of the mentioned advantages are evident with regard to the drawings. The elements of the drawings are not necessarily illustrated to scale with one another.

In the figures of the drawing, identical, functionally identical and identically-operating elements, features and components—provided that nothing else is stated—are respectively provided with the same reference numeral.

The figures are described below in a cohesive and comprehensive manner.

DESCRIPTION OF THE EXEMPLARY EMBODIMENTS

FIG. 1A illustrates schematically a cross-sectional view of a camera module 1, as said module is used in particular in the automobile sector, whilst FIG. 1B illustrates a three-dimensional view of the camera module 1:

A circuit board 3 is located in the interior 2 of the camera module 1, said circuit board typically being fitted with multiple electronic components 4. The electronic components are preferably and not exclusively opto-electronic image sensors and analog and digital components for pre-processing the opto-electronically-ascertained image data.

The pre-processed image data is transmitted via a communications interface to further data processing units within the motor vehicle. A first connector $\mathbf{5}_1$ that is only illustrated schematically in FIG. 1 is used as a communications interface, said connector being mechanically and electrically connected as a so-called circuit board connector to the circuit board 3. This first connector $\mathbf{5}_1$, as illustrated in FIG. 1A, may transition directly into a second connector $\mathbf{5}_2$ that as the housing connector is mechanically connected to the housing of the camera module 1 or is integrated into the housing of the camera module 1. The other output of the second connector $\mathbf{5}_2$ is respectively mechanically and electrically connected to a data cable that is not illustrated in FIGS. 1A and 1B. In an alternative to the combination of the first connector $\mathbf{5}_1$ and second connector $\mathbf{5}_2$ the output of the first connector $\mathbf{5}_1$ may also be directly electrically and mechanically connected to the data cable that is guided in a hermetically sealed manner through an opening in the housing of the camera module 1 toward the outside. The first and second connector $\mathbf{5}_1$ and $\mathbf{5}_2$ respectively fulfill the technical requirements of an arbitrary interface standard for high speed data transmission in the automobile sector, by way of example FAKRA (specialist automobile group, HSD, high speed data) or HFM (high speed fakra mini).

The image sensors of the circuit board 3 are optically connected to an optical lens 6.

The interior 2 of the camera module 1 is closed in a hermetically sealed manner via a camera housing 7. As illustrated in FIG. 1B, only the second connector $\mathbf{5}_2$ and the optical lens 6 are integrated in the camera housing 7 in a hermetically sealed manner. The camera housing 7 preferably comprises two housing parts $\mathbf{8}_1$ and $\mathbf{8}_2$. In some embodiments, the camera housing 7 may comprise a greater number of housing parts. With regard to a sealed closure of the interior 2 of the camera module 1, the two housing parts $\mathbf{8}_1$ and $\mathbf{8}_2$ are circumferentially welded to one another. Typically, the outer-side housing shells of the two housing parts $\mathbf{8}_1$ and $\mathbf{8}_2$, said outer-side housing shells being produced from synthetic material and described in further detail below, are preferably connected to one another by means of laser welding.

In accordance with the present disclosure, at least one housing part $\mathbf{8}_1$ and $\mathbf{8}_2$ respectively comprises an inner-side housing shell and an outer-side housing shell. It is preferred that the housing part $\mathbf{8}_1$ or the housing parts respectively comprises/comprise an inner-side housing shell $\mathbf{9}_{11}$ and an outer-side housing shell $\mathbf{9}_{12}$ that is/are arranged opposite the electronic components 4 or is/are irradiated with the highest proportion of the waste heat that is generated by the electronic components 4. In the figures of the drawing, this is the housing part $\mathbf{8}_1$ in which the connector 5 is integrated and that is arranged opposite the electronic components 4. It goes without saying that the other housing parts of the camera housing 1, such as the housing part $\mathbf{8}_2$ in which the optical lens 6 is typically integrated, may also respectively comprise an inner-side and an outer-side housing shell in order to dissipate the waste heat that is generated by the electronic components 4 more rapidly into the exterior space of the camera module 1.

The housing parts $\mathbf{8}_1$ and $\mathbf{8}_2$ typically respectively comprise multiple housing regions that are connected to one another respectively having an inner surface or outer surface that is oriented differently. In the figures of the drawing, the housing parts $\mathbf{8}_1$ and $\mathbf{8}_2$ by way of example comprise respectively four inner-side or outer-side side surfaces and one inner-side or outer-side base surface or cover surface. In some embodiments, the housing parts may have a number of housing regions that deviates from this number. In some embodiments, the housing parts may have respectively inner surfaces or outer surfaces that are oriented differently. The base surface and cover surface are respectively connected on all their surface limits respectively to another surface, in other words a side surface. The side surfaces are respectively open on a surface limit, in other words are not connected to a further surface, while said side surfaces are connected at the remaining surface limits to another surface, in other words to another side surface or the base surface or cover surface.

It is preferred that with regard to an optimal flow of heat in a housing part $\mathbf{8}_1$ in accordance with the present disclosure, as illustrated in all the figures of the drawing, the inner-side housing shell $\mathbf{9}_{11}$ is connected directly to the outer-side housing shell $\mathbf{9}_{12}$ via all the opposite-lying surface regions without including an air layer that is located between said inner-side and outer-side housing shells. In addition, the inner-side housing shell $\mathbf{9}_{11}$ and the outer-side housing shell $\mathbf{9}_{12}$ may also be only connected directly to one another without including air via a reduced opposite-lying surface region of the side surfaces, base surfaces or cover surfaces.

The outer-side housing shell $\mathbf{9}_{12}$ is produced from a synthetic material, by way of example from polybutylene terephthalate (PBT), in an injection molding technique. The inner-side housing shell $\mathbf{9}_{11}$ is produced from a material that is more capable of conducting heat than the synthetic material of the outer-side housing shell $\mathbf{9}_{12}$. It is preferred that a metal, by way of example zinc, is used. However, a synthetic material having electrically-conductive fillers, by way of example having metal fibers, is also possible. The inner-side housing shell $\mathbf{9}_{11}$ that is embodied from metal may be produced using a pressure casting technique, a sintering technique or a machining technique. The inner-side housing shell $\mathbf{9}_{11}$ that is embodied from synthetic material having electrically-conductive fillers may be produced by way of example by means of an injection molding technique.

The metal or the electrically-conductive fillers of the inner-side housing shell $\mathbf{9}_{11}$ is or are clearly more capable of conducting heat than the synthetic material of the outer-side housing shell $\mathbf{9}_{12}$. In this manner, the waste heat of the electronic components 4 that is received in a limited region of the inner-side housing shell $\mathbf{9}_{11}$ is distributed comparatively rapidly over the entire inner-side housing shell $\mathbf{9}_{11}$. In the ideal case, the outer surface of the inner-side housing shell $\mathbf{9}_{11}$ and the inner surface of the outer-side housing shell $\mathbf{9}_{12}$ are the same size. Consequently, in contrast to conventional camera housings that are embodied solely from synthetic material, the surface regions of the outer housing shell $\mathbf{9}_{12}$ that lie opposite the inner-side housing shell $\mathbf{9}_{11}$ are influenced respectively with only a fraction of the waste heat that is generated by the electronic components 4.

Since the inner-side housing shell $\mathbf{9}_{11}$ lies directly against the outer-side housing shell $\mathbf{9}_{12}$ in the respective opposite-lying surface regions without air being stored between said two housing shells, the waste heat that is dissipated from the inner-side housing shell $\mathbf{9}_{11}$ to the outer-side housing shell $\mathbf{9}_{12}$ is not stored temporarily in the air that is stored between said two housing shells and said waste heat is not only transferred to the outer-side housing shell $\mathbf{9}_{12}$ after a delay. On the contrary, the waste heat that is to be dissipated is immediately emitted by the inner-side housing shell $\mathbf{9}_{11}$ to the outer-side housing shell $\mathbf{9}_{12}$.

Since the inner housing shell $\mathbf{9}_{11}$, whose outer surface corresponds to the inner surface of the outer housing shell $\mathbf{9}_{12}$, is produced from a metal or from a synthetic material having integrated electrically-conductive fillers, the EMC characteristic of the camera module 1 is therefore additionally improved.

In order in addition to accelerate the transfer of heat between the inner-side housing shell $\mathbf{9}_{11}$ and the outer-side housing shell $\mathbf{9}_{12}$, the opposite-lying surface regions of the inner-side housing shell $\mathbf{9}_{11}$ and the outer-side housing shell $\mathbf{9}_{12}$ are moreover increased. For this purpose, at least one elevation, preferably multiple elevations that are respectively spaced at a specific distance, is provided in the respective opposite-lying surface regions on the outer surface of the inner-side housing shell $\mathbf{9}_{11}$ and said elevations are inserted in an associated depression on the inner side of the outer-side housing shell $\mathbf{9}_{12}$. In this manner, the upper surface of the respective opposite-lying surface regions of the inner-side housing shell $\mathbf{9}_{11}$ and the outer-side housing shell $\mathbf{9}_{12}$ are additionally enlarged.

Alternatively, the elevations may also be provided on the inner surfaces of the outer-side housing shell $\mathbf{9}_{12}$, said elevations being inserted in associated depressions on the outer surfaces of the inner-side housing shells $\mathbf{9}_{11}$.

The individual elevations are preferably directly inserted in the associated depressions without including air in order to accelerate the transfer of heat between the inner-side housing shell $\mathbf{9}_{11}$ and the outer-side housing shell $\mathbf{9}_{12}$.

A direct connection that is relieved of air between the individual elevations of the inner-side housing shell $\mathbf{9}_{11}$ and the associated depressions of the outer-side housing shell $\mathbf{9}_{12}$ is achieved in particular by means of a friction-type connection between the individual elevations and the associated depressions and therefore between the inner-side housing shell $\mathbf{9}_{11}$ and the outer-side housing shell $\mathbf{9}_{12}$. In this case, the width $X_{iG}$ of an elevation on the inner-side housing shell $\mathbf{9}_{11}$, as is illustrated in FIGS. 2A and 2B, is to be designed as larger than the width $X_{aG}$ of an associated depression on the outer-side housing shell $\mathbf{9}_{12}$. The inner-side housing shell $\mathbf{9}_{11}$ is moreover mechanically fixed by means of a friction-type connection of this type to the outer-side housing shell $\mathbf{9}_{12}$.

In a first variant in accordance with FIGS. 3A and 3B, the elevations on the outer surface of the inner-side housing shell $\mathbf{9}_{11}$ are realized as rib-shaped elevations $\mathbf{10}_1$ that are inserted in the associated slot-shaped depressions $\mathbf{11}_1$ on the inner surface of the outer-side housing shell $\mathbf{9}_{12}$. In this case, the rib-shaped elevations $\mathbf{10}_1$ may be realized in all the outer-side surfaces or outer-side surface regions of the inner-side housing shell $\mathbf{9}_{11}$ and the associated slot-shaped depressions $\mathbf{11}_1$ in all the inner-side surfaces or inner-side surface regions of the outer-side housing shell $\mathbf{9}_{12}$. In addition, the rib-shaped elevations $\mathbf{10}_1$ and the associated slot-shaped depressions $\mathbf{11}_1$ may also be brought about in a reduced number of outer-side surfaces or outer-side surface regions of the inner-side housing shell $\mathbf{9}_{11}$ or inner-side surfaces or inner-side surface regions of the outer-side housing shell $\mathbf{9}_{12}$. In FIGS. 3A and 3B, by way of example the rib-shaped elevations $\mathbf{10}_1$ and the associated slot-shaped depressions $\mathbf{11}_1$ are respectively located only on two side surfaces and the cover surface or base surface of the inner-side housing shell $\mathbf{9}_{11}$ and the outer-side housing shell $\mathbf{9}_{12}$.

The cross-sectional profile of the individual rib-shaped elevations $\mathbf{10}_1$ and the associated slot-shaped depressions $\mathbf{11}_1$ may be rectangular or square as in FIGS. 3A and 3B. Alternatively, a triangular cross-sectional profile is also possible. Circular or elliptical cross-sectional profiles are also possible in the region of the side surfaces of the inner-side housing shell $\mathbf{9}_{11}$ and the outer-side housing shell $\mathbf{9}_{12}$.

The height and the width of the rib-shaped elevations $\mathbf{10}_1$ and the depth or the width of the associated slot-shaped depressions $\mathbf{11}_1$ are preferably constant in the longitudinal extent. In one alternative embodiment, the height and the width of the rib-shaped elevations $\mathbf{10}_1$ and the associated slot-shaped depressions $\mathbf{11}_1$ may respectively reduce in the region of the side surfaces of the inner-side housing shell $\mathbf{9}_{11}$ and the outer-side housing shell $\mathbf{9}_{12}$ in the direction of the cover surface.

The distances between the individual rib-shaped elevations $\mathbf{10}_1$ and between the associated slot-shaped depressions $\mathbf{11}_1$ may either be constant or different.

In a second variant in accordance with FIGS. 4A, 4B and 4C, the elevations in the region of the outer-side cover surface on the inner-side housing shell $\mathbf{9}_{11}$ are respectively realized as lattice rib-shaped elevations $\mathbf{10}_2$ and the associated depressions in the region of the inner-side cover surface are realized on the outer-side housing shell $\mathbf{9}_{12}$ respectively as lattice slot-shaped depressions $\mathbf{11}_2$. In lieu of a rectangular or square cross-sectional profile of the lattice rib-shaped elevations $\mathbf{10}_2$ and the lattice slot-shaped depressions $\mathbf{11}_2$, in the case of the second variant a triangular cross-sectional profile is also possible.

In the second variant, the distances between the individual ribs of the lattice rib-shaped elevations $\mathbf{10}_1$ and between the individual associated individual slots of the lattice slot-shaped depressions $\mathbf{11}_1$ may also be either constant or different.

In a third variant in accordance with FIGS. 5A, 5B and 5C, the elevations in the region of the outer-side cover surface on the inner-side housing shell $\mathbf{9}_{11}$ are respectively realized as pin-shaped elevations $\mathbf{10}_3$ and the associated depressions in the region of the inner-side cover surface are respectively realized on the outer-side housing shell $\mathbf{9}_{12}$ as blind hole-shaped depressions $\mathbf{11}_3$. In lieu of a circular cross-sectional profile of the pin-shaped elevations $\mathbf{10}_3$ and the blind hole-shaped depressions $\mathbf{11}_3$ in accordance with FIGS. 5A and 5B, rectangular, square, triangular, polygon-shaped or elliptical cross-sectional profiles are also possible.

In the third variant, the individual pin-shaped elevations $10_3$ or the associated blind hole-shaped depressions $11_3$ may be positioned respectively at a constant spacing, in other words in a specific grid pattern, or entirely irregularly, in other words may be distributed stochastically. The height of the individual pin-shaped elevations $10_3$ and the depth of the associated blind hole-shaped depressions $11_3$ may also be respectively constant with respect to one another or may also be different with respect to one another. In addition, the outer diameter of the individual pin-shaped elevations $10_3$ and the inner diameter of the individual blind hole-shaped depressions $11_3$ may also be respectively constant or different.

In a further embodiment, the upper surface of the inner surfaces and accordingly of the inner surface regions of the inner-side housing shell $9_{11}$ is additionally enlarged in order to accelerate the flow of heat of the inner-side housing shell $9_{11}$.

For this purpose, in a first embodiment in accordance with FIG. 3A rib-shaped elevations $12_1$ are provided on the inner surfaces of the inner-side housing shell $9_{11}$, in particular on the inner surface of the cover surface of the inner-side housing shell $9_{11}$. The height of the rib-shaped elevations $12_1$ and the distance between the rib-shaped elevations $12_1$ in this case is selected in such a manner that the distance between the electronic components 4 and the rib-shaped elevations $12_1$ is as minimal as possible and a sufficient number of rib-shaped elevations $12_1$ are positioned in the region that emits waste heat.

In a second embodiment in accordance with FIGS. 4A and 4C, lattice rib-shaped elevations $12_2$ are provided on the inner surface of the inner-side housing shell $9_{11}$, in particular on the inner surface of the cover surface of the inner-side housing shell $9_{11}$. The height and distance stated above with regard to the first embodiment similarly applies for the height of the lattice rib-shaped elevations $12_2$ and for the distance between the individual ribs of the lattice rib-shaped elevations $12_2$.

In a third embodiment in accordance with FIGS. 5A and 5C, pin-shaped elevations $12_3$ are provided on the inner surface of the inner-side housing shell $9_{11}$, in particular on the inner surface of the cover surface of the inner-side housing shell $9_{11}$. The height and distance stated above with regard to the first embodiment similarly applies for the height of the pin-shaped elevations $12_2$ and for the distance between the pin-shaped elevations $12_2$. The diameter of the individual pin-shaped elevations $12_2$ in relation to the distance between the individual pin-shaped elevations $12_2$ is to be selected in such a manner that an optimized inner-side upper surface of the inner-side housing shell $9_{11}$ is brought about. In lieu of a circular cross-sectional profile of the individual pin-shaped elevations $12_3$, rectangular, square, triangular, polygon-shaped or elliptical cross-sectional profiles are also possible.

Although the present invention has been completely described above with the aid of preferred exemplary embodiments, said invention is not limited to said exemplary embodiments, but rather may be modified in diverse ways. In particular, an arbitrary combination of the individual variants and embodiments is covered by the invention provided that the combination is technically expedient.

LIST OF REFERENCE NUMERALS

1 Camera module
2 Interior of the camera module
3 Circuit board
4 Electronic components
$\mathbf{5}_1$, $\mathbf{5}_2$ First and second connector
6 Optical lens
7 Camera housing
$\mathbf{8}_1$, $\mathbf{8}_2$ Housing parts
$\mathbf{9}_{11}$, $\mathbf{9}_{12}$ Outer-side housing shell and inner-side housing shell
$\mathbf{10}_1$, $\mathbf{10}_2$, $\mathbf{10}_3$ Rib-shaped, lattice rib-shaped and pin-shaped elevations (on outer surfaces of the inner-side housing shell)
$\mathbf{11}_1$, $\mathbf{11}_2$, $\mathbf{11}_3$ Rib-shaped, lattice rib-shaped and pin-shaped depressions
$\mathbf{12}_1$, $\mathbf{12}_2$, $\mathbf{12}_3$ Rib-shaped, lattice rib-shaped and pin-shaped elevations (on inner surfaces of the inner-side housing shell)

The invention claimed is:

1. A housing, comprising:
an outer housing shell of a plastic material; and
an inner housing shell of a second material, wherein
a thermal conductivity of said second material is higher than a thermal conductivity of said plastic material,
said inner housing shell is shaped to nest into said outer housing shell such that substantially an entire outer surface of said inner housing shell contacts an inner surface of said outer housing shell in a nested configuration of said inner housing shell and said outer housing shell,
an entire major outer surface of said inner housing shell contacts said inner surface in said nested configuration,
said inner housing shell frictionally engages said outer housing shell in said nested configuration,
said major outer surface of said inner housing shell comprises a plurality of protruding structures,
said inner surface of said outer housing shell comprises a plurality of indentations, and
each of said plurality of indentations receives a respective one of said plurality of protruding structures in said nested configuration in a manner that improves a transfer of heat from said inner housing shell to said outer housing shell.

2. The housing of claim 1, wherein:
each of said protruding structures is larger than a respective one of said plurality of indentations and frictionally fixingly engages the respective indentation in said nested configuration.

3. The housing of claim 1, wherein:
each of said protruding structures frictionally fixingly engages a respective one of said plurality of indentations in said nested configuration, and
each of said protruding structures has a dimension that is larger than a corresponding dimension of the respective indentation.

4. The housing of claim 1, wherein:
said inner surface of said outer housing shell has an overall concave shape.

5. The housing of claim 1, wherein:
said plurality of protruding structures comprises a first plurality of rib-shaped structures and a second plurality of rib-shaped structures substantially perpendicular to said first plurality of rib-shaped structures in crisscross arrangement.

6. The housing of claim 1, wherein:
said plurality of protruding structures comprises a plurality of pin-shaped structures.

7. A housing, comprising:
an outer housing shell of a plastic material; and
an inner housing shell of a second material, wherein
a thermal conductivity of said second material is higher than a thermal conductivity of said plastic material,
said inner housing shell is shaped to nest into said outer housing shell such that substantially an entire outer surface of said inner housing shell contacts an inner surface of said outer housing shell in a nested configuration of said inner housing shell and said outer housing shell,
an entire major outer surface of said inner housing shell contacts said inner surface in said nested configuration,
said inner housing shell frictionally engages said outer housing shell in said nested configuration,
said major outer surface of said inner housing shell comprises a plurality of indentations,
said inner surface of said outer housing shell comprises a plurality of protruding structures, and
each of said plurality of indentations receives a respective one of said plurality of protruding structures in said nested configuration in a manner that improves a transfer of heat from said inner housing shell to said outer housing shell.

8. The housing of claim 7, wherein:
each of said protruding structures is larger than a respective one of said plurality of indentations and frictionally fixingly engages said respective indentation in said nested configuration.

9. The housing of claim 7, wherein:
each of said protruding structures frictionally fixingly engages a respective one of said plurality of indentations in said nested configuration, and
each of said protruding structures has a dimension that is larger than a corresponding dimension of the respective indentation.

10. The housing of claim 7, wherein:
said inner surface of said outer housing shell has an overall concave shape.

11. The housing of claim 7, wherein:
said plurality of protruding structures comprises a first plurality of rib-shaped structures and a second plurality of rib-shaped structures substantially perpendicular to said first plurality of rib-shaped structures in crisscross arrangement.

12. The housing of claim 7, wherein:
said plurality of protruding structures comprises a plurality of pin-shaped structures.

13. A camera assembly, comprising:
an outer housing shell of a plastic material;
an inner housing shell of a second material; and
a camera housed in said outer housing shell, wherein
a thermal conductivity of said second material is higher than a thermal conductivity of said plastic material,
said inner housing shell is shaped to nest into said outer housing shell such that substantially an entire outer surface of said inner housing shell contacts an inner surface of said outer housing shell in a nested configuration of said inner housing shell and said outer housing shell,
an entire major outer surface of said inner housing shell contacts said inner surface in said nested configuration,
said inner housing shell frictionally engages said outer housing shell in said nested configuration,
at least one of said major outer surface of said inner housing shell and said inner surface of said outer housing shell comprises a first protruding structure,
another of said major outer surface and said inner surface comprises an indentation, and
said indentation matingly receiving said first protruding structure in a manner that improves a transfer of heat from said inner housing shell to said outer housing shell.

14. A housing assembly method, comprising:
providing an outer housing shell of a plastic material,
providing an inner housing shell of a second material, and
nesting said inner housing shell into said outer housing shell such that substantially an entire outer surface of said inner housing shell contacts an inner surface of said outer housing shell and said inner housing shell frictionally engages said outer housing shell, wherein
said inner housing shell is nested into said outer housing shell such that an entire major outer surface of said inner housing shell contacts said inner surface,
a thermal conductivity of said second material is higher than a thermal conductivity of said plastic material,
at least one of said major outer surface of said inner housing shell and said inner surface of said outer housing shell comprises an indentation,
another of said major outer surface and said inner surface comprises a first protruding structure, and
said indentation matingly receiving said first protruding structure in a manner that improves a transfer of heat from said inner housing shell to said outer housing shell.

15. The camera assembly of claim 13, wherein:
said major outer surface comprises said first protruding structure, and
said inner housing shell comprises second protruding structure that extends inwardly opposite said first protruding structure.

16. The housing assembly of claim 14, wherein:
said major outer surface comprises said first protruding structure, and
said inner housing shell comprises second protruding structure that extends inwardly opposite said first protruding structure.

17. The housing of claim 1, wherein:
an outer surface of said inner housing shell comprises a plurality of slots distributed around a circumference of said inner housing shell,
said outer housing shell comprising a plurality of ribs, and
each of said slots receives a respective one of said plurality of ribs in said nested configuration in a manner that improves a transfer of heat from said inner housing shell to said outer housing shell.

18. The housing of claim 7, wherein:
an outer surface of said inner housing shell comprises a plurality of slots distributed around a circumference of said inner housing shell,
said outer housing shell comprising a plurality of ribs, and
each of said slots receives a respective one of said plurality of ribs in said nested configuration in a manner that improves a transfer of heat from said inner housing shell to said outer housing shell.

19. The camera assembly of claim 13, wherein:
an outer surface of said inner housing shell comprises a plurality of slots distributed around a circumference of said inner housing shell,
said outer housing shell comprising a plurality of ribs, and
each of said slots receives a respective one of said plurality of ribs in said nested configuration in a manner that improves a transfer of heat from said inner housing shell to said outer housing shell.

20. The housing assembly method of claim 14, wherein:

an outer surface of said inner housing shell comprises a plurality of slots distributed around a circumference of said inner housing shell, said outer housing shell comprising a plurality of ribs, and each of said slots receives a respective one of said plurality of ribs in said nested configuration in a manner that improves a transfer of heat from said inner housing shell to said outer housing shell.

* * * * *